United States Patent [19]

Clark

[11] Patent Number: 4,853,451

[45] Date of Patent: Aug. 1, 1989

[54] TERPOLYMER EMULSIONS

[75] Inventor: Nigel L. Clark, Banstead, England

[73] Assignee: Unilever Patent Holdings B.V., Rotterdam, Netherlands

[21] Appl. No.: 284,780

[22] Filed: Dec. 12, 1988

Related U.S. Application Data

[63] Continuation of Ser. No. 80,363, Jul. 29, 1987, abandoned.

[30] Foreign Application Priority Data

Jul. 30, 1986 [GB] United Kingdom ................. 8618632

[51] Int. Cl.$^4$ ........................................... C08F 118/02
[52] U.S. Cl. .................................... 526/331; 524/819
[58] Field of Search ......................... 524/819; 526/331

[56] References Cited

U.S. PATENT DOCUMENTS

| | | | |
|---|---|---|---|
| 3,755,237 | 8/1973 | Isaacs et al. | 526/307.6 |
| 3,816,363 | 6/1974 | Wicht | 524/459 |
| 3,830,761 | 8/1974 | Lenney | 524/825 |
| 4,073,779 | 2/1978 | Wiest et al. | 526/330.1 |
| 4,094,849 | 6/1978 | Oyamada et al. | 524/819 |
| 4,123,405 | 10/1978 | Oyamada et al. | 524/822 |
| 4,331,577 | 5/1982 | Hanna | 526/331 |

FOREIGN PATENT DOCUMENTS

| | | |
|---|---|---|
| 88920 | 10/1981 | Australia. |
| 1355012 | 5/1974 | United Kingdom. |
| 1404349 | 8/1975 | United Kingdom. |
| 1544327 | 4/1979 | United Kingdom. |

*Primary Examiner*—Joseph L. Schofer
*Assistant Examiner*—J. M. Reddick
*Attorney, Agent, or Firm*—Cushman, Darby & Cushman

[57] ABSTRACT

Terpolymer emulsions of vinyl acetate, vinyl chloride and ethylene are used in surface coatings, e.g. paints, and require certain properties for this application. The dry tensile strength and water uptake properties of such terpolymers is improved by adding monomer with the initiator during the reaction at rates which provide a reservoir of free monomer in the medium.

7 Claims, No Drawings

TERPOLYMER EMULSIONS

This is a continuation of application Ser. No. 080,363, filed July 29, 1987, now abandoned.

FIELD OF THE INVENTION:

This invention relates to terpolymer compositions in emulsion form comprising vinyl acetate, vinyl chloride and ethylene as the principal monomer components. Terpolymer emulsions of this class are usable as bases for surface coatings, for example paints.

BACKGROUND OF THE INVENTION:

Terpolymers of this class are usable in a variety of applications dependent on the ratios of the monomers selected. Utilities include paints and other surface coatings intended for internal and external applications. These terpolymers are required to have certain properties to perform well in these surface coating applications, as an example, the terpolymers must have satisfactory tensile strength, elongation and water uptake.

GENERAL DESCRIPTION:

The invention provides an emulsion of a terpolymer of vinyl acetate, vinyl chloride and ethylene having a monomer composition of

| Vinyl acetate | 10 to 90 parts by weight preferably 30 to 80 |
| --- | --- |
| Vinyl chloride | 5 to 50 parts by weight preferably 10 to 40 |
| Ethylene | 5 to 40 parts by weight preferably 10 to 30 | and having improved properties of value in its application for surface coatings.

The invention provides a process for the preparation of the terpolymer defined wherein from about 10% to 100% of each of the monomer charges of vinyl acetate and vinyl chloride is introduced into the reaction vessel with at least about 50% of the ethylene charge in the absence of initiator and the remainder of the monomer charge added over a period together with the initiator system at a rate which ensures there is a reservoir of free monomer in the reaction medium.

During the major period of the reaction the sum of the concentration of free vinyl acetate and vinyl chloride monomers should be at least 5%, preferably at least 10%, by weight of the total reaction medium.

It is believed this process improvement leads to an increase in molecular weight with consequent improvement in tensile strength and reduction in water uptake.

Preferably the total ethylene charge is present in the reaction medium before the initiator is added. Although the process is operable and provides an improvement in terpolymer properties without this feature, the presence of the total ethylene charge at the initial stage assists in control of the subsequent polymerisation.

Preferably the initial charge prior to addition of polymerisation initiator comprises at least about 20% and up to about 50% of the vinyl acetate and vinyl chloride monomers.

There is a general requirement to improve the properties of the terpolymers of the invention to ensure they are suitable for external use and the process modification described provides improvement in the desired properties.

Optionally the terpolymer may include minor amounts of monomer components included to provide specific benefits, examples are sodium vinyl sulphonate, acrylic acid, methacrylic acid, acrylamide and hydroxy functional acrylates.

Literature:

In Australian patent application No. 88920/82 (Wacker) there is described the preparation of vinyl chloride/ethylene copolymers in the presence of an inert organic substance to increase the proportion of ethylene in the comonomer. There is a disclosure of the metering in of vinyl monomers at a time when there is unpolymerised vinyl monomers present, however the concentration of unpolymerised monomers is required to be kept low preferably below 5% by weight of the total dispersion. Additionally the present invention is performed in the absence of inert organic substances.

GB No. 1355012 (Wacker) describes preparation of copolymer emulsions in which the reaction temperature is guided by the addition of the peroxy catalyst component. Example 9 relates to a terpolymer which is prepared with an initial charge of 83% monomers but to this is added initiator before the addition of further monomer.

Other disclosures of terpolymer emulsions are found in GB 1404349 (Air Products) and GB 1544327 (Sumitomo).

EXAMPLE

An example of the process and a comparative process will now be given to illustrate but not limit the invention.

The terpolymer was produced from a monomer composition of:

Vinyl acetate: 960.5 g
Vinyl chloride: 425 g
Ethylene: 306 g

Comparative process:

This process is based on procedures standard in the industry.

An aqueous solution with the composition listed below was prepared and loaded into a pressure reactor (3.7 liters capacity).

| Hydroxy ethyl cellulose* | 17 g |
| --- | --- |
| Anionic surfactant (75% aq)** | 45.4 g |
| Sodium vinyl sulphonate | 8.5 g |
| Ferric chloride | 0.017 g |
| Distilled water | to 52% non-volatile content |
| Formic acid | to give pH 3 to 3.5 |

*obtained from Hercules Ltd of London, England under the trade name Natrosol 250LR
**obtained from Lankro Chemicals Ltd of Manchester, England under the trade name Perlankrol RN75

The reactor was flushed first with nitrogen and then with ethylene. The agitator was then started, the vessel contents heated to 30° C. and the whole of the ethylene component introduced into the vessel to give a pressure of 54 bars.

5% by weight of each of the vinyl acetate and vinyl chloride were added at this stage to form an initial monomer charge.

| A. | |
| --- | --- |
| Sodium persulphate | 6.8 g |
| Sodium bicarbonate | 5.1 g |

-continued

| | |
|---|---|
| Distilled water | 170 g |
| B. | |
| Sodium formaldehyde sulphoxylate | 3.4 g |
| Distilled water | 170 g | had been previously prepared and 10% of each solution added to the vessel containing the 5% monomer charge, the temperature of which was allowed to rise as the initial monomer charge polymerised.

15 minutes after the addition of the initiator solutions, the remaining 95% of the monomer components was added continuously over a period of 4 hours. The addition of the remaining 90% of the initiator solutions was commenced together with the monomer components, but the initiator solutions were added continuously over a period of 5 hours. The temperature was maintained at 60° C. during these additions of monomers and initiators with continuing agitation.

At the end of the 5 hour period the reaction mass was cooled to ambient temperature while adding final stage initiator solutions C & C over a period of 0.5 hours.

| | |
|---|---|
| C. | |
| t-butyl hydroperoxide (10% solution) | 5.1 g |
| sodium bicarbonate | 1.7 g |
| distilled water | 34 g |
| D. | |
| Sodium metabisulphite | 5.1 g |
| distilled water | 34 g |

Process of Invention:

The process described previously was modified by introducing 30% of the monomer charge of vinyl acetate and vinyl chloride into the pressure vessel but in the absence of initiator. In the comparative process 5% of the monomer charge was mixed with 10% of the initiator solutions A and B. This step establishes a high concentration of monomer in the reaction medium.

The remaining 70% of the monomer charge was then run in continuously over a period of 3.5 hours in parallel with the initiator solutions A and B, the latter were added over a 5 hour period. This mode of utilising the initiator system ensured a reservoir of free monomers existed in the reaction medium. During the major period of the reaction the sum of the concentration of free vinyl acetate and vinyl chloride monomers should be at least 5%, preferably at least 10%, by weight of the total reaction medium. During the continuous addition the temperature was maintained at 60° C.

At the end of the 5 hour period the reaction mass was cooled to ambient temperature while adding final stage initiator solutions C and D over a period of 0.5 hours.

After completion of the two processes the terpolymer emulsions were tested for maximum tensile strength, elongation at break and water uptake.

A continuous film of polymer was prepared by applying a film of emulsion of 0.1 mm thickness to a PTFE coated glass plate and drying the film for 7 days at 20° C. After this period specimens were cut from it for the tests. Tensile strength and Elongation were measured using an Instron Tensometer at an extension rate of 50 mm per minute at 20° C. Water uptake was measured as the percentage weight increase of terpolymer film samples after 24 hours immersion in water at 20° C.

TABLE

| | Comparative Terpolymer | Terpolymer of invention |
|---|---|---|
| Maximum Tensile Strength (Kgf/cm$^2$) | 11.0 | 18.0 |
| Elongation at break (percent) | 962 | 840 |
| Water up take (percent) | 51.7 | 13.6 |

These results demonstrate the terpolymer prepared by the process of the present invention had improved tensile strength and water uptake.

I claim:

1. A process for the the preparation of a terpolymer having a monomer composition of

| | |
|---|---|
| Vinyl acetate | 10 to 90 parts by weight |
| Vinyl chloride | 5 to 50 parts by weight |
| Ethylene | 5 to 40 parts by weight | wherein from about 10% to 100% of the monomer charge of vinyl acetate and vinyl chloride is introduced into the reaction vessel with at least about 50% of the ethylene charge in the absence of initiator and any remainder of the monomer charge being added over a period together with the initiator system at a rate which ensures there is a reservoir of free monomer in the reaction medium.

2. A process according to claim 1 wherein the terpolymer has a monomer composition of:

| | |
|---|---|
| Vinyl acetate | 30 to 80 parts by weight |
| Vinyl chloride | 10 to 40 parts by weight |
| Ethylene | 10 to 30 parts by weight |

3. A process according to claim 2 wherein the terpolymer has a monomer composition of:

| | |
|---|---|
| Vinyl acetate | 45 to 65 parts by weight |
| Vinyl chloride | 15 to 35 parts by weight |
| Ethylene | 10 to 30 parts by weight |

4. A process according to claim 1 or 3 wherein the total ethylene charge is present in the reaction medium before the initiator is added.

5. A process according to claim 1 wherein the initial charge prior to addition of initiator comprises from about 10 to about 50% of the vinyl acetate and vinyl chloride monomer.

6. A process according to claim 1 wherein the initial charge prior to addition of initiator comprises at least about 20% of the vinyl acetate and vinyl chloride monomers.

7. A terpolymer of vinyl acetate, vinyl chloride and ethylene prepared by the process of claim 1, the terpolymer being characterized by its improved tensile strength and water uptake.

* * * * *